United States Patent [19]
Peonski

[11] 3,950,855
[45] Apr. 20, 1976

[54] GAGING APPARATUS FOR DOUBLE DISC GRINDER OR THE LIKE

[75] Inventor: Edward Peonski, West Dundee, Ill.

[73] Assignee: American Gage & Machine Company, Elgin, Ill.

[22] Filed: May 6, 1974

[21] Appl. No.: 467,202

[52] U.S. Cl............................. 33/143 L; 33/147 L; 33/172 E
[51] Int. Cl.²........................................... G01B 7/02
[58] Field of Search........... 33/143 R, 143 L, 147 L, 33/147 N, 169 R, 172 E; 51/165 R, 165.91, 165.88, 165.83

[56] References Cited
UNITED STATES PATENTS
3,581,402   6/1974   London et al..................... 33/147 L Primary Examiner—Richard E. Aegerter
Assistant Examiner—Willis Little
Attorney, Agent, or Firm—Burmeister, York, Palmatier, Hamby & Jones

[57] ABSTRACT

The disclosed gaging apparatus is especially advantageous for gaging the thickness of workpieces which are discharged in a stream from a double disc grinder, or some other similar machine. The workpieces travel along guide means, including a guide member along which one side of each workpiece is slidable. The other side of each workpiece is engaged by a contact bar which extends transversely to the direction of movement of the workpieces, and is generally parallel to such guide member. The contact bar is mounted on a carriage which is supported for movement toward and away from such guide member. In accordance with the present invention, the carriage is also supported for rocking movement so that the contact bar can align itself precisely with the abutting surface of each workpiece. A gaging head is employed to detect movement of the carriage toward and away from the guide member, such movement being due to variations in the thickness of the workpieces. The gaging head may be adapted to produce electrical signals which may be employed to readjust the tool slides of the grinder, if the grinder is producing work which is slightly oversize or undersize.

11 Claims, 6 Drawing Figures

GAGING APPARATUS FOR DOUBLE DISC GRINDER OR THE LIKE

This invention relates to a gaging apparatus which will find many applications but is especially well adapted for gaging the thickness of workpieces which are discharged in a stream by a double disc grinder or the like.

Workpieces such as piston rings, bearing races, and many other items can be gound on both sides by a double disc grinder. The grinding operation establishes the thickness of the workpieces. It is desirable to gage the thickness of the workpieces as they are discharged from the grinder, and to use the gaging information to readjust the grinder so as to maintain the thickness of the workpieces within the prescribed tolerance limits. However, difficulties have been experienced with prior gaging devices when attempts have been made to use such devices with a double disc grinder. It is believed that these difficulties are due, at least in part, to the fact that the workpieces are discharged by the grinder with considerable speed and force. It has been found that prior gaging devices are prone to getting out of adjustment after only very brief usage, so that bad work is produced until the lack of adjustment is corrected.

One object of the present invention is to provide a new and improved gaging apparatus which will stay in adjustment in such service, over a long period of time.

In accordance with the present invention, the gaging apparatus preferably employs one or more contact bars, mounted on a carriage which is not only movable toward and away from the workpiece guide, but also is rockable about a pivot axis, so that the contact bar can align itself with the abutting surface of each workpiece. The gaging apparatus includes resilient biasing means for resisting the rocking movement of the contact bar, while also providing for pressure between the contact bar and the workpiece. A gaging head is provided to detect any slight movement of the carriage, toward and away from the workpiece guide. Thus, the gage head responds to any variations in the thickness of the workpiece.

The pivotal support for the carriage may be provided by a leaf spring which is both flexible and twistable. A pair of coil springs on opposite sides of the pivot axis may be employed to bias the carriage.

In another arrangement, the pivotal support for the carriage may be provided by a pivot pin. Here again, the resilient centering action may be provided by a pair of coil springs. It has been found that the provision of the self-aligning rockable contact bar makes it possible for the gaging apparatus to stay in adjustment for an indefinite period so that reliable and consistent results are achieved. The gaging head may be of a type which produces electrical signals, so that such signals may be employed to readjust the double disc grinder to maintain the thickness of the workpieces within the prescribed tolerance limits.

Further objects, advantages and features of the present invention will appear from the following description, taken with the accompanying drawings, in which.

Figure 1:
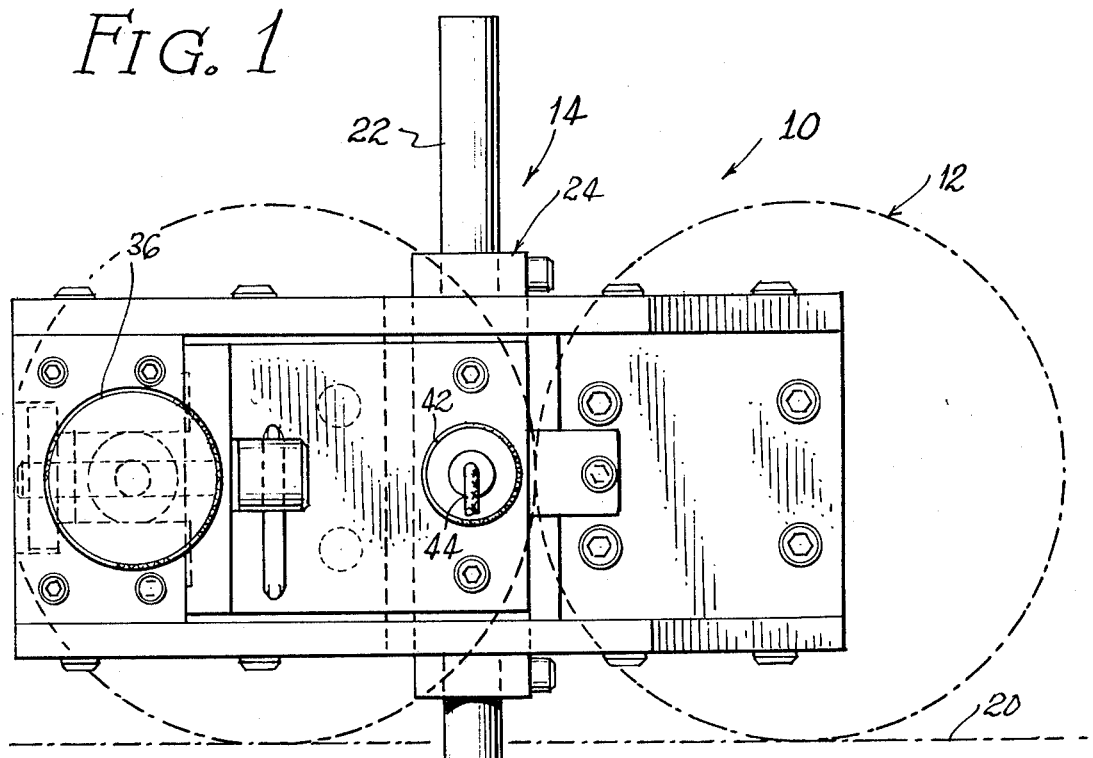
FIG. 1 is a front elevation of gaging apparatus to be described as an illustrative embodiment of the present invention.
Figure 2:
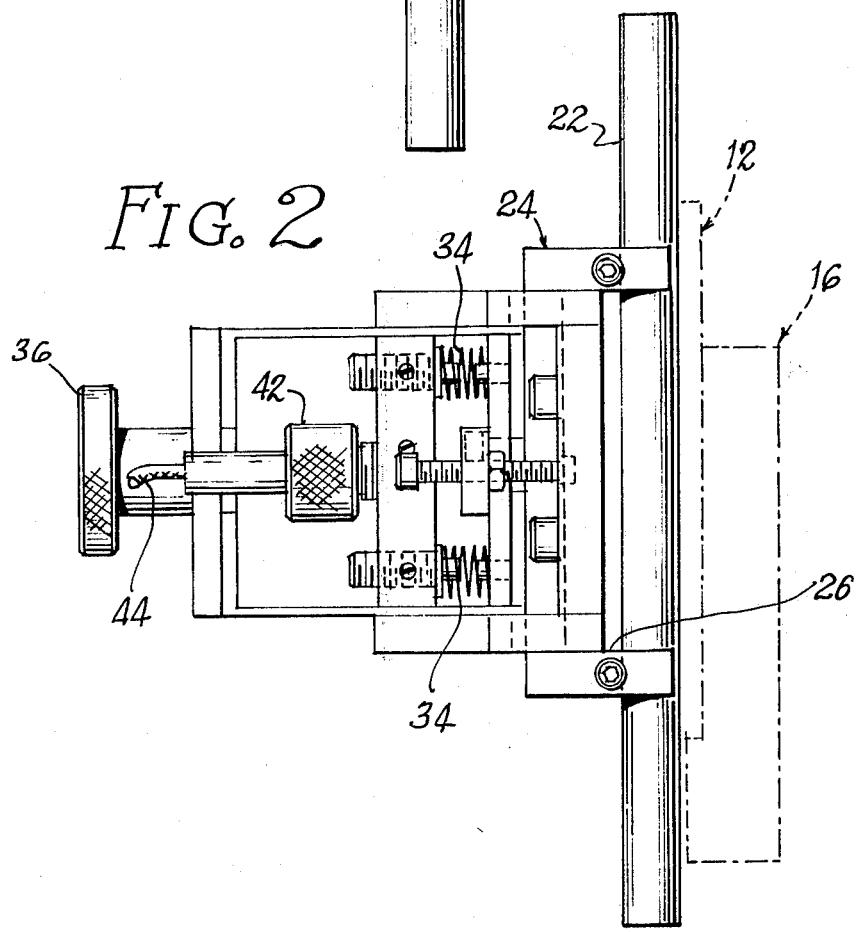
FIG. 2 is a side elevation of the gaging apparatus of FIG. 1.
Figure 3:
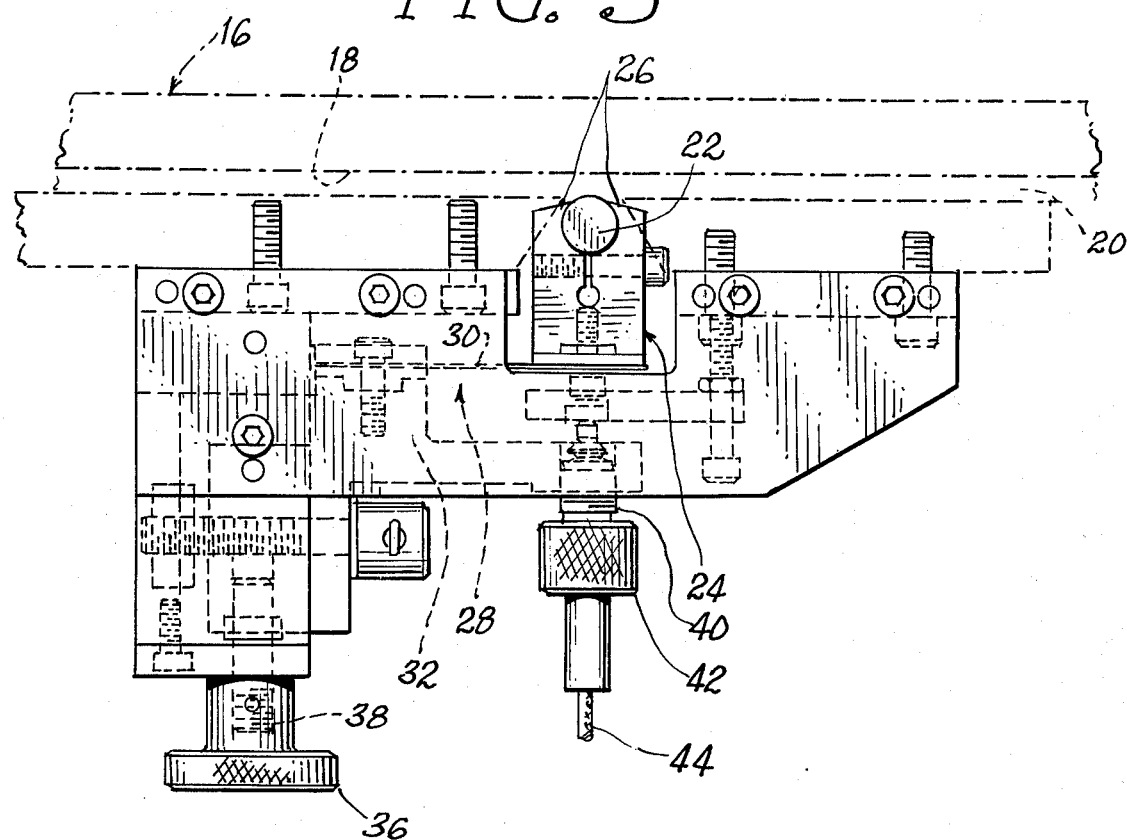
FIG. 3 is a plan view of the gaging apparatus of FIG. 1.

As just indicated, FIGS. 1–3 illustrate a gaging apparatus 10 which will find various applications but is particularly well suited for gaging the thickness of workpieces 12, which may be in the form of piston rings, for example, discharged from a double disc grinder or other machine. In the usual case, the workpieces 12 are discharged in a stream, with each workpiece following immediately behind its predecessor and serving to propel its predecessor past the gaging station 14. The gaging apparatus 10 may include guide means 16, including a guide member 18, having a flat surface along which one side of each workpiece is slidable. The guide member 18 is used as a reference plane in gaging the thickness of the workpieces 12. In this case, the guide means 16 may also include a generally horizontal ledge 20, adapted to support the workpiece 12.

While one side of each workpiece 12 is engaging the guide member 18, the other side is engaged by the contact member or bar 22 at the gaging station 14. In this case, the contact bar 22 is in the form of a cylindrical rod extending generally parallel to the guide member 18 and transversely to the direction of movement of the workpieces 12. The contact bar 22 is preferably made of a hard, wear-resistant material, such as tungsten carbide, for example.

The contact bar 22 is supported for movement toward and away from the guide member 18, and also for longitudinal rocking movement, so that the bar 22 can align itself with the surface presented by each workpiece. Thus, the contact bar 22 is mounted on a carriage 24, preferably by means of clamps 26, as shown in FIG. 3. From time to time, the clamps 26 may be loosened so that the bar 22 can be rotated slightly to present a new wearing surface to the workpieces. The clamps 26 may then be tightened. In this way, the useful life of the contact bar 22 can be greatly prolonged.

The gaging apparatus 10 includes support means 28 for supporting the carriage 24 for movement toward and away from the guide member 18, and also for pivotal rocking movement. In this case, such support means 28 includes a flexible and twistable leaf spring 30 which is connected between the carriage 24 and an adjustable slide or member 32. The spring 30 can readily be flexed so as to provide for movement of the carriage 24 toward and away from the guide member 18. In addition, the leaf spring 30 can be twisted to a limited extent about its own axis so as to provide for rocking movement of the carriage 24 and the contact bar 22. Thus, the leaf spring 30 acts as a pivotal support for the contact bar 22.

The carriage 24 is biased by resilient means 34 which may be connected between the carriage and the slide 32. As shown in FIG. 2, such resilient means 34 may take the form of a pair of coil springs disposed between the carriage 24 and the slide 32. Such coil springs 34 are disposed on opposite sides of the pivotal axis formed by the leaf spring 30. Thus, the coil springs 34 tend to center the contact bar 22 initially, in a position parallel with the guide member 18.

By rotating a control knob 36, the slide 32 can be advanced and retracted, so as to adjust the force developed by the springs 34. The knob 36 cooperates with an adjusting screw 38. The gaging apparatus 10 preferably includes a gaging head 40 adapted to detect and measure any movement of the carriage 24, toward and away from the guide means 18. The gaging head 40 may be of any known and suitable type. Thus, the gaging head 40 may include a transducer for producing variable electrical signals in response to any movement of the carriage 24. Such signals may be employed to control and readjust the double disc grinder so that the thickness of the workpieces will be maintained within the prescribed tolerance limits. The gaging head 40 may include an adjusting nut 42 whereby the position of the gaging head 40 can be adjusted. The gaging head 40 may be adjustably mounted on the slide 32. An electrical cable 44 may be provided to connect the gaging head 40 to the control circuits for the grinding machine.

As each workpiece 12 is fed past the gaging station 14, the contact bar 22 engages the abutting surface of the workpiece. The springs 34 develop pressure which is applied to the workpiece by the contact bar 22 so that the workpiece is pressed against the guide member 18. The contact bar 22 is capable of rocking about the pivot axis formed by the leaf spring 30, so that the contact bar 22 automatically aligns itself with the abutting surface of the workpiece. Thus, the contact bar 22 always engages the workpiece squarely.

Even if the workpiece 12 comes to the gaging station in a position such that it is not squarely engaged with the guide member 18, no damage is caused to the gaging apparatus, and the gaging appartus is not knocked out of adjustment. Instead, the contact bar 22 simply rocks slightly to align itself with the workpiece, and then pushes the workpiece against the guide member 18.

Figure 4:
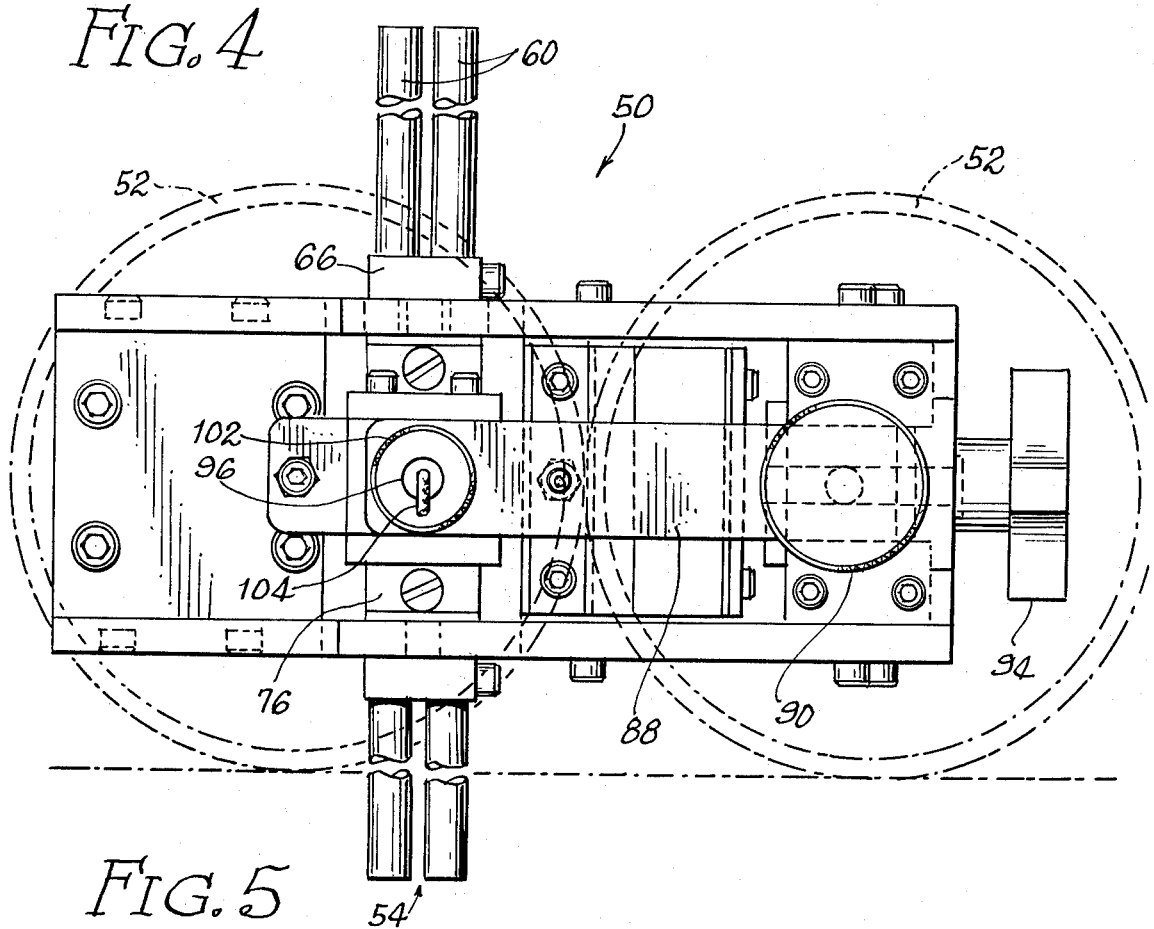
FIG. 4 is a front view of a modified gaging apparatus, constituting another embodiment of the present invention.
Figure 5:
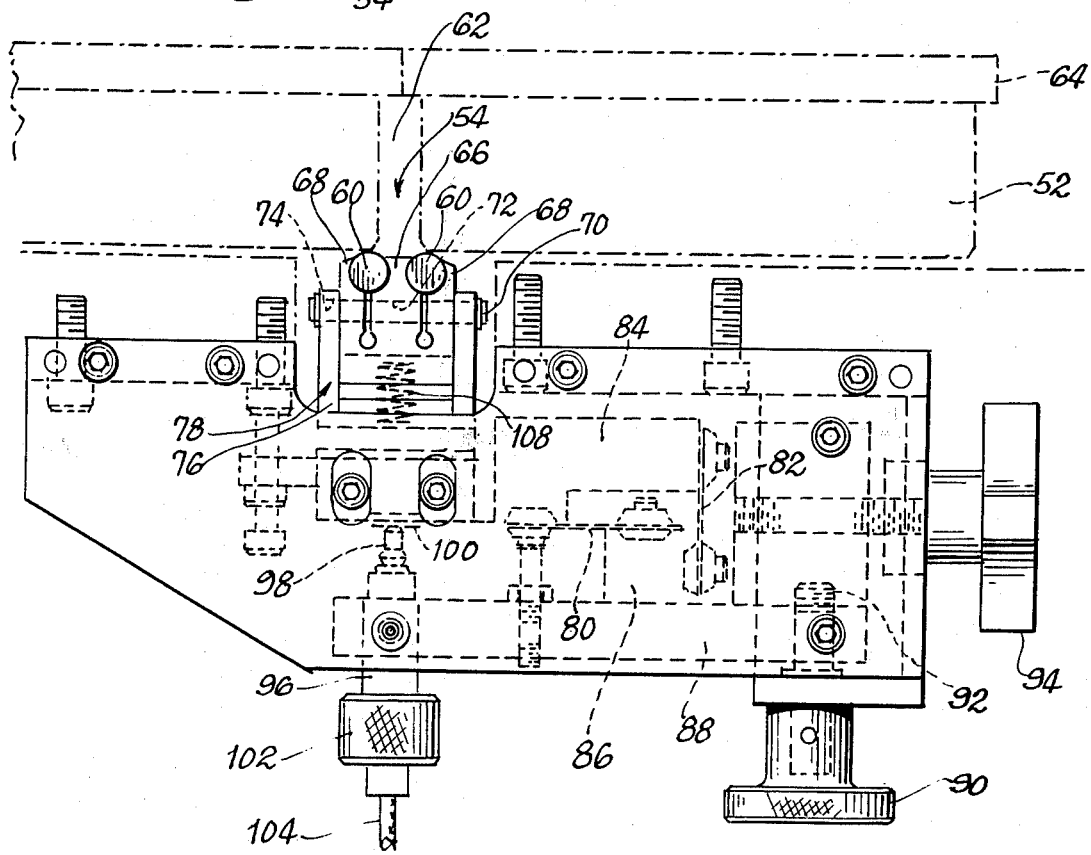
FIG. 5 is a plan view of the gaging apparatus of FIG. 4.
Figure 6:
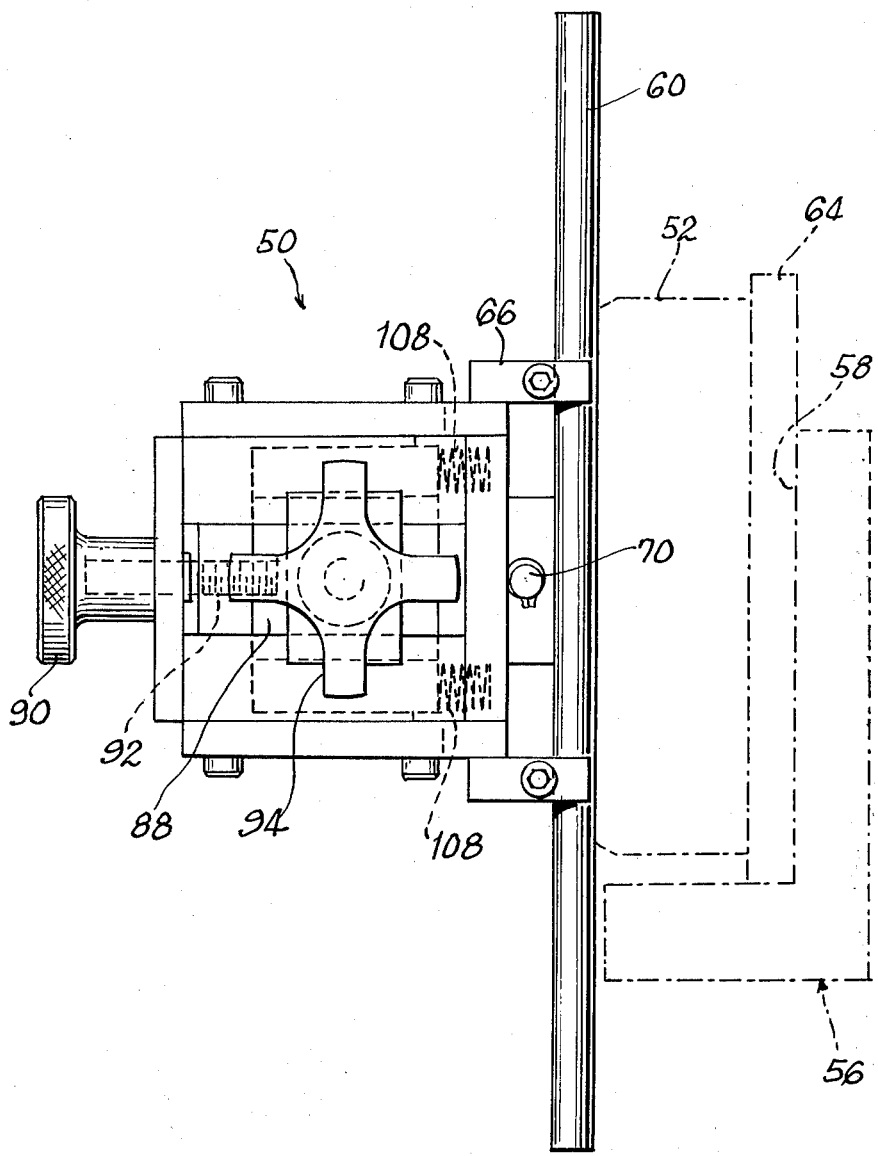
FIG. 6 is a side elevation of the gaging apparatus of FIG. 4.

FIGS. 4–6 illustrate a modified gaging apparatus 50 adapted to gage the thickness of workpieces 52, which in this case are in the form of bearing races, discharged in a stream from a double disc grinder or the like. The workpieces 52 travel continuously past a gaging station 54 and are supported in their movement by guide means 56, including a guide member 58 along which one side of each workpiece is slidable.

In this case, there are two parallel contact bars 60 to engage the opposite side of each workpiece 52. As shown in FIG. 5, the contact bars 60 are spaced apart sufficiently to span the gap 62 between the successive workpieces in the stream. This gap 62 occurs because these particular workpieces are formed with outwardly projecting flanges 64. The provision of two parallel contact bars 60 prevents either contact bar from dropping into the gap 62.

As before, the contact bars 60 are generally parallel to the guide member 58 and are generally perpendicular or transverse to the direction of movement of the workpieces 52. The contact bars 60 are preferably mounted on a movable carriage 66. As before, the carriage 66 is supported for movement toward and away from the guide member 58, and also for pivotal or rocking movement about an axis which is generally parallel to the direction of movement of the workpiece 52. The provision for this rocking movement makes it possible for the contact bars 60 to align themselves with the successive workpieces 52.

As shown in FIG. 5, the contact bars 60 are preferably secured to the carriage 66 by clamping elements 68, which make it possible to readjust the contact bars 60 from time to time, so that fresh wearing surface elements are presented to the workpieces 52. The contact bars 60 are preferably made of a hard wear-resistant material, such as tungsten carbide.

In this case, the carriage 66 is rockably supported by a pivot pin 70 which extends through an opening 72 in the carriage 66, and also through openings 74 in a second carriage 76. The carriages 66 and 76 may be regarded as components of a carriage unit or assembly 78.

To provide for movement of the contact bars 60 toward and away from the guide member 58, the second carriage 76 is supported for such movement by support means, illustrated as being in the form of leaf springs 80 and 82. It will be seen from FIG. 5 that the leaf springs 80 and 82 are connected between the member 84 on the second carriage 76 and a member 86 on an adustable slide 88. The springs 80 and 82 extend along axes which are generally perpendicular to each other. This arrangement provides a resilient support which permits flexing movement, but resists twisting movement. The flexing movement makes it possible for the second carriage 76, the first carriage 66 and the contact bars 60 to move toward and away from the guide member 58. The twisting movement is not needed in this case, because the pivot pin 70 makes it possible for the carriage 66 to rock so as to change the angular relationship between the contact bars and the guide member 58. The springs 80 and 82 also afford resilient resistance to the movement of the contact bars 60, away from the guide member 58, so that the springs produce resilient pressure between the contact bars 60 and the successive workpieces 52.

This pressure can be adjusted by turning an adjusting knob or wheel 90, which has the effect of advancing or retracting the slide 88. The knob 90 operates a feed screw 92. A second knob or wheel 94 is provided to clamp the slide 88 in its adjust position.

The gaging apparatus 50 of FIGS. 4–6 utilizes a gaging head 96 which is similar to that previously described. The gaging head 96 is mounted on the adjustable slide 88 and has an operating plunger 98 which engages a member 100 on the second carriage 76. The gaging head 96 can be advanced and retracted by operating an adjusting nut 102.

As before, the gaging head 96 may be of any known or suitable type, adapted to detect any slight movement of the carriage 76. Thus, the gaging head 96 indicates the distance between the guide member 58 and the contact bars 60. Preferably, the gaging head 96 utilizes a transducer which produces output signals for operating an indicating instrument. Such signals may also be employed to readjust the tool slides of the grinder, to maintain the thickness of the workpieces within the prescribed tolerance limits. Illustrated gaging head 96 has an electrical cable 104 to deliver the signals produced by the gaging head.

The gaging apparatus 50 of FIGS. 4–6 includes resilient means for biasing the carriage 66 to resist rocking movement of the carriage and the contact bars 60. As shown in FIG. 5, such resilient means may take the form of a pair of coil springs 108, disposed above and below the pivot axis of the pin 70, and acting between the first and second carriages 66 and 76. The springs 108 have a centering action in that they bias the carriage 26 to an initial position in which the contact bars 60 are parallel with a guide member 58.

If any workpiece 52 is not squarely engaged with the guide member 58, the contact bars 60 are able to rock so as to be aligned with such workpiece. This self-aligning action prevents any workpiece from damaging the gaging apparatus or knocking it out of adjustment.

It has been found that the gaging apparatus of the present invention will keep its adjustment over a long period of time, due to the fact that the contact bar or bars will self-align with the workpiece. Thus, the gaging apparatus will give consistent and reliable results.

I claim:

1. Gaging apparatus for gaging the thickness of workpieces discharged in a stream from a double disc grinder or other machine,
    comprising guide means for conducting the stream of workpieces in a predetermined direction past a gaging station therealong,
    a movable carriage disposed opposite said guide means at said gaging station,
    an elongated contact bar mounted on said carriage and movable therewith toward and away from said guide means for engaging the opposite side of each workpiece,
    said contact bar having a length substantially greater than the transverse dimensions of said bar,
    said contact bar extending generally parallel to said guide means and transversely to said predetermined direction of movement of said workpieces,
    support means supporting said carriage for movement of said contact bar toward and away from said guide means and for rocking movement of said contact bar about a rocking axis generally parallel to said predetermined direction to vary the angular relationship of said contact bar to said guide means,
    said support means including resilient means acting upon said carriage for applying pressure between said contact bar and the successive workpieces while accommodating said rocking movement of said contact bar so that said contact bar will align itself with each workpiece,
    and a gaging head for detecting movement of said contact bar toward and away from said guide means to gage the thickness of each workpiece.

2. Gaging apparatus according to claim 1, in which said support means comprises a leaf spring which is flexible to accommodate movement of said contact bar toward and away from said guide means while also being twistable to accommodate said rocking movement of said contact bar.

3. Gaging apparatus according to claim 2, in which said resilient means includes a pair of centering springs acting upon said carriage on opposite sides of the rocking axis defined by said leaf spring.

4. Gaging apparatus according to claim 1, in which said resilient means comprises centering spring means acting on said carriage on opposite sides of the rocking axis of said support means.

5. Gaging apparatus according to claim 1, in which said support means includes a pivot supporting said carriage for rocking movement, and additional means supporting said carriage for movement toward and away from said guide means.

6. Gaging apparatus according to claim 5, in which said additional means includes flexible leaf spring means supporting said carriage.

7. Gaging apparatus according to claim 6, in which said resilient means includes centering spring means for resiliently resisting the rocking movement of said contact bar.

8. Gaging apparatus according to claim 1, in which said resilient means includes centering spring means for resiliently resisting the rocking movement of said contact bar.

9. Gaging apparatus according to claim 1, in which said support means includes a second carriage,
    a pivot connected between said second carriage and said first mentioned carriage to support said first mentioned carriage for rocking movement,
    and means supporting said second carriage for movement toward and away from said guide means,
    said resilient means including spring means acting between said first and second carriages for resiliently resisting rocking movement of said first mentioned carriage.

10. Gaging apparatus according to claim 1, in which said support means includes a second carriage,
    a pivot connected between said second carriage and said first mentioned carriage to support said first mentioned carriage for rocking movement,
    and leaf spring means supporting said second carriage for movement toward and away from said guide means while also resiliently resisting such movement away from said guide member to afford spring pressure between said contact bar and each workpiece,
    said resilient means including spring means acting between said second carriage and said first mentioned carriage for resiliently resisting rocking movement of said first mentioned carriage.

11. Gaging apparatus according to claim 10, in which said last mentioned spring means includes a pair of coil springs acting between said carriages on opposite sides of the rocking axis afforded by said pivot.

* * * * *